US008047472B1

(12) United States Patent
Brand et al.

(10) Patent No.: US 8,047,472 B1
(45) Date of Patent: Nov. 1, 2011

(54) RAM BOOSTER

(75) Inventors: Vance D. Brand, Tehachapi, CA (US);
Walter Ray Morgan, Simi Valley, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 612 days.

(21) Appl. No.: 12/045,970

(22) Filed: Mar. 11, 2008

Related U.S. Application Data

(63) Continuation-in-part of application No. 11/422,554, filed on Jun. 6, 2006, now abandoned.

(51) Int. Cl.
 *B64G 1/00* (2006.01)
(52) U.S. Cl. ............... 244/158.9; 244/158.1; 244/171.1; 244/171.3
(58) Field of Classification Search ............... 244/158.1, 244/158.9, 159.1, 159.3, 171.1, 171.3, 171.4
See application file for complete search history.

(56) References Cited

U.S. PATENT DOCUMENTS

| 3,063,240 | A | * | 11/1962 | Ledwith | 60/225 |
| 3,066,480 | A | * | 12/1962 | Buck | 60/266 |
| 3,215,372 | A | * | 11/1965 | Price | 244/74 |
| 5,593,110 | A | * | 1/1997 | Ransom et al. | 244/3.23 |
| 5,740,985 | A | * | 4/1998 | Scott et al. | 244/2 |
| 6,450,452 | B1 | * | 9/2002 | Spencer et al. | 244/159.3 |
| 6,612,522 | B1 | * | 9/2003 | Aldrin et al. | 244/2 |
| 6,616,092 | B1 | * | 9/2003 | Barnes et al. | 244/2 |
| 6,817,580 | B2 | | 11/2004 | Smith | |

* cited by examiner

*Primary Examiner* — Joshua Michener
*Assistant Examiner* — Philip J Bonzell
(74) *Attorney, Agent, or Firm* — Mark Homer

(57) ABSTRACT

The present invention is a space launch system and method to propel a payload bearing craft into earth orbit. The invention has two, or preferably, three stages. The upper stage has rocket engines capable of carrying a payload to orbit and provides the capability of releasably attaching to the lower, or preferably, middle stage. Similar to the lower stage, the middle stage is a reusable booster stage that employs all air breathing engines, is recoverable, and can be turned-around in a short time between missions.

7 Claims, 6 Drawing Sheets

RAM BOOSTER

RELATION TO OTHER APPLICATIONS

This application is a continuation-in-part to application Ser. No. 11/422,554, filed on Jun. 6, 2006 now abandoned and applicants hereby request this priority date for all subject matter contained herein from said previously filed application.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to propelling a payload into low-earth orbit, more particularly to providing a booster first stage for a payload bearing rocket second stage going to low-earth orbit, and most particularly to providing a reusable, all air-breathing booster first stage for a payload bearing rocket second stage going to low-earth orbit.

2. Description of The Related Art

Most reusable space launch systems to date have employed two approaches: 1) Single stage to orbit (DCX or National Aero-Space Plane), or 2) Recoverable upper stage (Space Shuttle). Problems with the first approach include the requirement for extremely high fuel mass fractions (>90% of gross liftoff weight "GLOW"), plus the need to put all of the vehicle structural mass into orbit with a very small payload mass fraction (typically <1% of GLOW). Problems associated with the second approach include expending or requiring refurbishment of a larger structural mass (external tanks expended and solid rocket boosters refurbished in the case of the shuttle). A heat resistant surface is required for the upper stage and there is still a need to place into orbit more than four times the actual payload mass. The recovered upper stage portion of the launch system must be designed for re-entry speeds up to Mach 25 and extreme heating. Also, as evidenced by the space shuttle, the high-speed re-entry tends to require extensive inspection and maintenance during turn-around for subsequent launches.

A third approach has also been suggested that employs a staged rocket system launched from a winged platform (e.g., Pegasus XL, launched from an L-1011 aircraft). While achieving reasonable payload mass fractions (relative to the expendable rocket launcher portion), because of physical sizing constraints, this concept currently is limited to about 1000 lbs of payload to orbit, and a fairly high specific launch cost ($/lb$_m$).

In a further effort to overcome some of these deficiencies, another approach is a reusable booster stage using a combination of a rocket propelled main stage and a pair of turbojet engines mounted on the main stage (U.S. Pat. No. 6,817,580). However, this concept still results in numerous deficiencies including requirement for a plurality of different propellants, low useable life for the main rocket stage, requirement for reaction control devices for the main stage, and increased turn-around time for reuse due to the rocket engine main stage.

Therefore, it is desired to provide a reusable launch system that has a relatively low launch cost, decreased turn-around time between launches, and improved efficiency and safety characteristics over current reusable launch systems.

SUMMARY OF THE INVENTION

The invention proposed herein comprises a space launch system and method to propel a payload into earth orbit. The upper stage is a production, expendable rocket designed to carry a payload. The lower stage is a booster that is reusable and powered completely by air breathing propulsion. Preferably, the invention includes a middle stage that is also reusable and is also powered completely by air breathing propulsion. A main objective of the system and method is to significantly reduce the costs of propelling payloads, such as satellites, etc., into low-earth orbit by employing a system that provides a reusable booster first stage with significantly increased user life and significantly decreased turn-around time and maintenance compared to current systems.

Accordingly, it is an objective of this invention to provide a space launch system that reduces turn-around time compared to current systems between launches.

It is another objective to provide a space launch system of significantly reduced cost to propel a payload into earth orbit compared to current systems.

It is also an objective of this invention to provide lower and middle stages that employ a single type of fuel using air-breathing engines with a high specific impulse.

It is a further objective of this invention to provide lower and middle stages that do not require a reaction control system.

This invention meets these and other objectives related to propelling payloads into low earth orbit by providing a reusable space launch system booster lower stage and, preferably, middle stage, to help propel a payload bearing rocket upper stage into orbit around the earth. The lower or first stage comprises a cylindrical housing, having a fuel tank containing fuel within the housing, that is releasably attached to the stage above it. A drogue parachute and a plurality of main parachutes are stored in and releasably attached to the housing. A plurality of fins are attached to the outer surface of the housing to provide aerodynamic stability and control. Also, a plurality of landing struts are attached to the fins for landing the reusable booster after each use. A plurality of air breathing engines are attached to the fins and struts, radiating outwards from the housing. A portion of these engines, located outboard of the other engines, employ a system for deflecting the exhausts in tangential directions relative to the circumference of the center tank, allowing directional and roll control at low speeds just after liftoff, and during recovery. The air breathing engines are provided fuel through a connection with the fuel tank in the housing. A preferable middle or second stage comprises a cylindrical housing, having a fuel tank containing fuel within the housing, that is releasably attached to the lower and upper stages. A plurality of fins are also attached to the outer surface of the housing to provide aerodynamic stability and control. The middle stage also has a drogue parachute and a plurality of main parachutes stored therein and either a plurality of air breathing engines attached circumferentially around the housing or an annular air breathing engine surrounding the housing.

BRIEF DESCRIPTION OF THE DRAWINGS

In the drawings, which are not necessarily to scale, like or corresponding parts are denoted by like or corresponding reference numerals.

DESCRIPTION OF PREFERRED EMBODIMENTS

The present invention is a space launch system and method to propel a payload bearing craft into earth orbit. The invention comprises two or three stages. The upper stage primarily includes rocket engines, propellant tanks, and a payload volume and the upper stage provides the capability of releasably attaching to a lower or middle stage. The lower stage is a reusable booster stage that employs all air breathing engines, is recoverable, and can be turned-around in a short time between missions. Preferably, a middle stage is employed that is a reusable booster stage that also employs all air breathing engines that is also recoverable and can be turned around in a short time between missions. The invention is capable of being practiced using a majority of parts that are currently available "off the shelf" with minor modifications and these parts require significantly less maintenance and preparation between missions than current launch system parts/systems. This results in the ability to dramatically increase the number of missions over time and significantly reduce the cost per mission.

Figure 1:
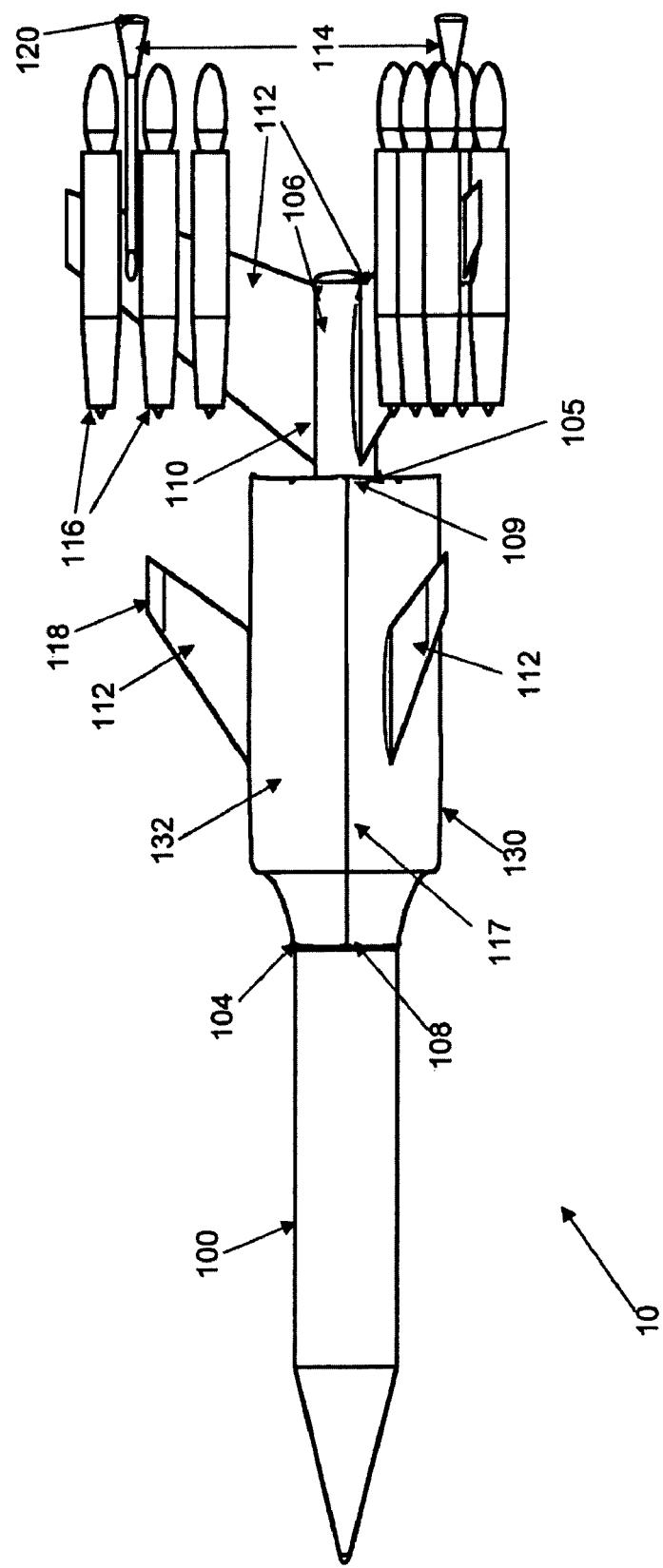
FIG. 1 depicts a side view of an embodiment of the present invention.

Referring to FIG. 1, the invention is a launch system 10 comprising an upper stage 100 of a production rocket engine that is capable of carrying a payload. A mating, ring 104 attaches releasably to the bottom of the upper stage 100. A first release mechanism 108 is employed to disconnect the upper stage 100 from the lower stage 106 or, preferably, the middle stage 130. Preferably the first release mechanism 108 comprises a pyrotechnic device that is actuated via computer control.

The lower stage 106 is a booster stage that launches and propels the system to a selected point in the atmosphere prior to ignition of the upper stage 100. The lower stage 106 comprises a housing 110 that is preferably cylindrical in shape. A plurality of fins, preferably with moveable tips, 112 are attached to the housing 110 to provide aerodynamic stability and control to the launch system 10. A plurality of landing struts 114 are attached to the fins 112 to provide landing support to the lower stage. Preferably, the landing struts employ shock attenuation and have landing pads 120 at the end of each strut 114. Also, a plurality of air breathing engines 116 are connected to the fins 112, in a configuration radiating outwards from the housing 110 and parallel to its center axis.

The air breathing engines 116 should be configured so that propulsion, when all of the engines are actuated, is somewhat evenly distributed around the system 10. Those engines 116 located furthest outboard from the system centerline also possess means for deflecting the exhaust in two dimensions, such that directional and roll control of the system can be maintained, in low speed flight for launch and recovery of the lower stage 106.

Preferably, the invention also comprises a middle stage 130 that is releasably connected to the upper stage 100 via the mating ring 104 and is releasably connected to the lower stage 106 via a second mating ring 105. A second release mechanism 109 is employed to disable the second mating ring 105 to stage or disconnect the middle stage 130 from the lower stage 106. Preferably the second release mechanism 109 also comprises a pyrotechnic device that is actuated via computer control. The middle stage 130 comprises a housing 132 that is also preferably cylindrical in shape, and, most preferably, similar in shape to the lower stage housing 110. A plurality of fins, preferably with moveable tips, 112 are attached to the housing 132 to provide aerodynamic control and stability to the launch system 10. A plurality of air breathing engines 117 are connected around the middle stage housing 132 so that propulsion, when all of the engines are actuated, is somewhat evenly distributed around the system 10. In the alternative, a single annular air breathing engine 117 surrounds the housing 132. These airbreathing engines 116 will preferably be Ramjets, with few moving internal parts and capable of operation between speeds of Mach 2.0 and Mach 4.0 or even higher.

Referring to FIGS. 1, 2, and 4a-4d, the invention also comprises fuel tanks 400 within the housings 110 and 132 that carry fuel for the engines 116, 117. Therefore, the fuel tanks 400 are connected to the engines 116, 117 in a manner to allow fuel from the fuel tanks 400 to flow into the engines 116, 117. The sizing and operation of the fuel tanks 400 may be selected by one skilled in the art, based upon the size of the housing, the weight of the tanks 400 and fuel and other launch requirements.

The lower and middle stages 106, 130 contain a descent mechanism 401 to slow the descent of each stage 106, 130 so that they can be recovered for later use. Preferably, the descent mechanism 401 includes at least one supersonic drogue parachute 402 (or alternatively ballute) that is releasably attached within the housings 110, 132. The number and size of drogue parachutes 402 employed in the invention may be selected by one skilled in the art based upon the weight of the lower and middle stages 106, 130. A pair of first deployment mechanisms (preferably explosive mortars) 404 are used to deploy the drogue parachutes 402. The first deployment mortars 404 are preferably located inside the drogue parachute cavity within housings 110, 132. The aft cover 401 is detached from the housings 110, 132 when the first deployment mechanism 404 is initiated to allow the drogue parachutes 402 to be deployed. The first attachment/release mechanism 406 may be selected by one skilled in the art. One preferred example of an attachment/release mechanism is an electrically actuated initiator that contains an explosive charge driven guillotine for cutting parachute risers to release a drogue chute 402. The first attachment/release mechanism 406 allows for the drogue parachutes 402 to be jettisoned after use. The drogue parachutes 402 are used for initial reduction in the descent speed of the lower and middle stages 106, 130 as described further below.

Regarding the preferable lower stage 106 descent mechanism, a plurality of main parachutes 408 are releasably attached to the aft end of the housing 110. In a preferred embodiment, four main parachutes 408 are used in the invention. A second deployment mechanism 410, preferably an electrically initiated pilot chute mortar, is used to deploy a pilot chute 405 that pulls a main parachute pack 407 from within the housing 110. Each main parachute pack 407 deploys into a main parachutes 408. Finally, a second attachment/release mechanism 412, preferably similar to the first attachment/release mechanism, is used to jettison the main parachutes 408.

During descent, the deceleration and pitch rotation of the lower stage 106 occurs as follows. The drogue parachutes 402 are jettisoned and the main parachutes 408 opened at about 15,000 feet altitude. At about 7,500 feet altitude, the lower stage 106 is released from the deployed four main parachutes 408. At the instant of release, a portion of the air breathing engines 116 are at idle thrust and a portion of the air breathing engines 116 have accelerated to partial thrust. The rotation for pitch-up is accomplished by thrust vector control of the outboard turbofan engines 116, that have been accelerated to partial thrust, which have exhaust vanes to deflect the flow of exhaust gases. In addition to the thrust vector control of the lower stage 106, the deceleration and pitch is augmented by aerodynamic control consisting of four all-movable surfaces on the tips of the fins 118. The number and location of air breathing engines 116 at idle thrust and at partial thrust may be determined by one skilled in the art. Preferably, twelve air breathing engines 116 remain at idle thrust and six air breathing engines 116 accelerate to partial thrust.

At approximately 7,500 feet the pitch-up maneuver starts immediately after the main parachute strap 416 is pyrotechnically separated from its attach point at the aft end of housing 110. A rapid pitch-up maneuver is instigated by cooperatively deflecting the exhaust of the outboard fanjet engines 116 and simultaneously deflecting the all-moving control surfaces comprising the outer tips of the fins 118.

After the lower stage 106 has pitched-up through an angle of more than 160 degrees to a tail down attitude, all of the air breathing engines 116 are accelerated to operating thrust (without afterburner) for a controlled vertical descent to touchdown. The lower stage 106 descends to touchdown on a barge in the ocean, or if sufficient fuel is allotted, returns to the launch site for touchdown. The drogue and main parachutes 402, 408 all independently float to earth for recovery and re-use.

In a preferred embodiment of the invention, the descent mechanism for the middle stage 130 is similar to that of the lower stage 106, except that the four main parachutes remain attached through splashdown and landing struts are not included in the middle stage 130. The pitch rotation maneuver following jettison of the main parachutes 408 is not required for the middle stage 130 because it splashes nose-down into the ocean with main parachutes 408 still attached. Middle stage drogue parachute cables and main parachute risers all attach to the aft end of the middle stage 130. All electronic boxes and electrical harnesses in the middle stage 130 are encased and water-proofed for, protection from salt water during and following splashdown. The Ramjet engine(s) 116 used on the middle stage 130 are relatively impervious to the effects of water, with almost no moving parts. The fuel tanks will be sealed off and slightly pressurized with inert gas after the ramjet engines shut down, such that they also are not damaged by exposure to seawater, and also provide buoyancy to keep this stage afloat until recovered.

For the lower and middle stages 106, 130, an onboard computer 414 within the housing 110, 132 autonomously controls guidance, navigation, and flight control, and onboard systems sequencing from pre-launch until after touchdown of the reusable portion of the system 10. In a preferred embodiment of the invention, selected system controls may be backed up by remote manual command up-linked from the launch site. The specific control mechanisms and schemes may be selected by one skilled in the art employing currently used launch systems, and devices.

Figure 3:
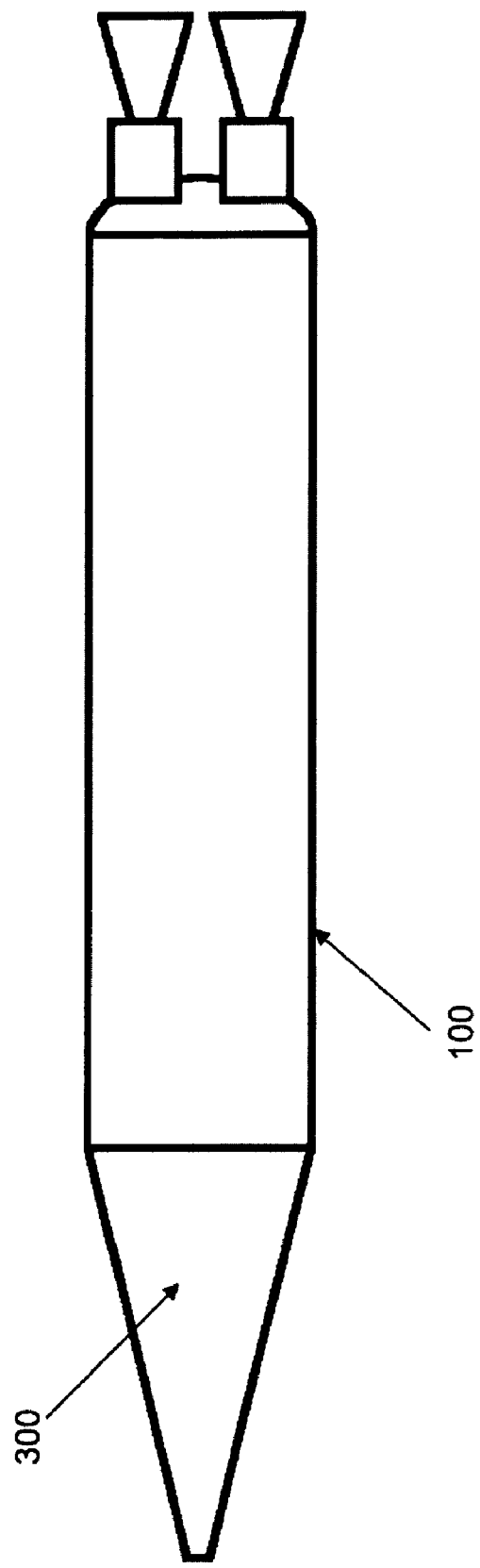
FIG. 3 depicts a side view of the upper stage of the launch system shown in FIG. 1.
Figure 4A:
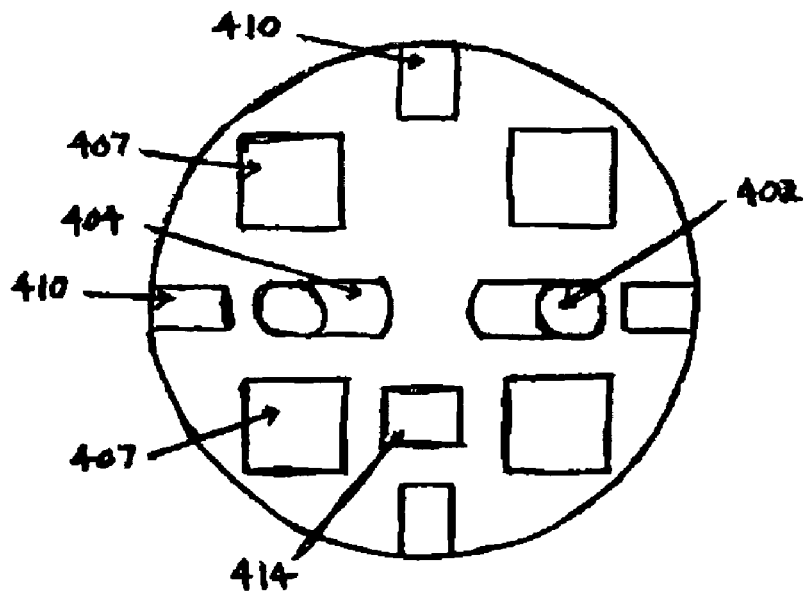
FIG. 4a depicts a cut away view of the aft end of the cylindrical housing on the lower stage of the launch system shown in FIG. 1.
Figure 4B:
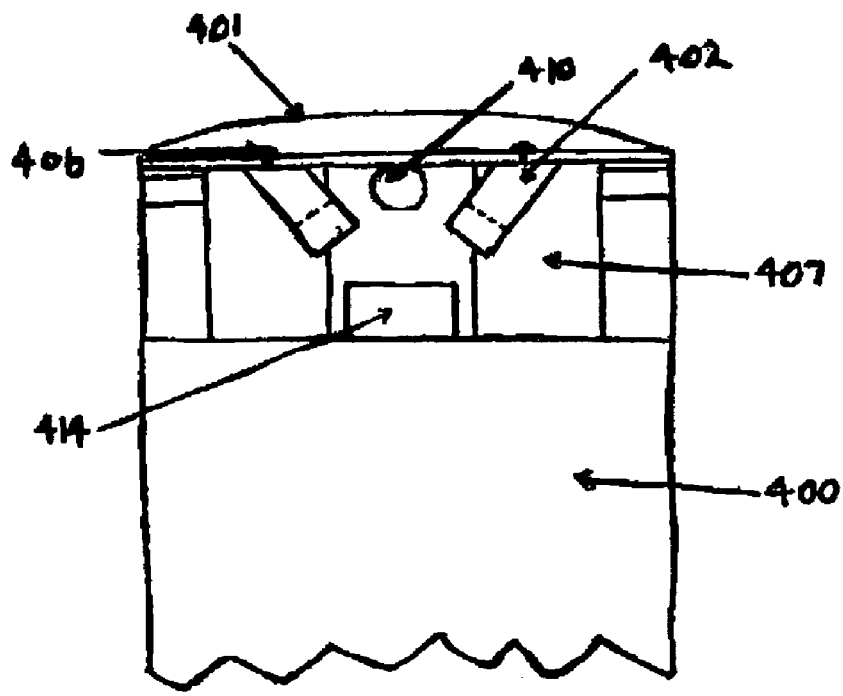
FIG. 4b depicts a side cut away view of the aft end of the cylindrical housing on the lower stage of the launch system shown in FIG. 1.
Figure 4C:
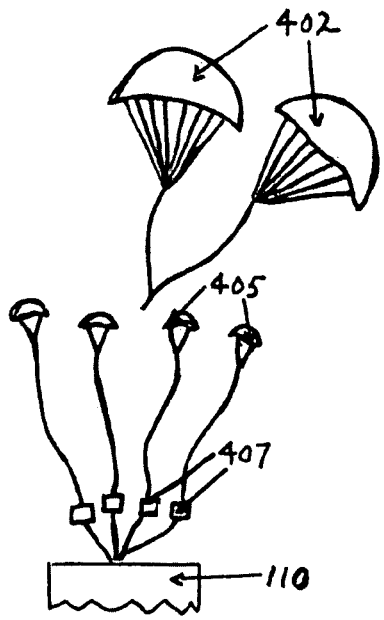
FIG. 4c depicts a view of the drogue parachutes being released and the pilot parachutes deployed.
Figure 4D:
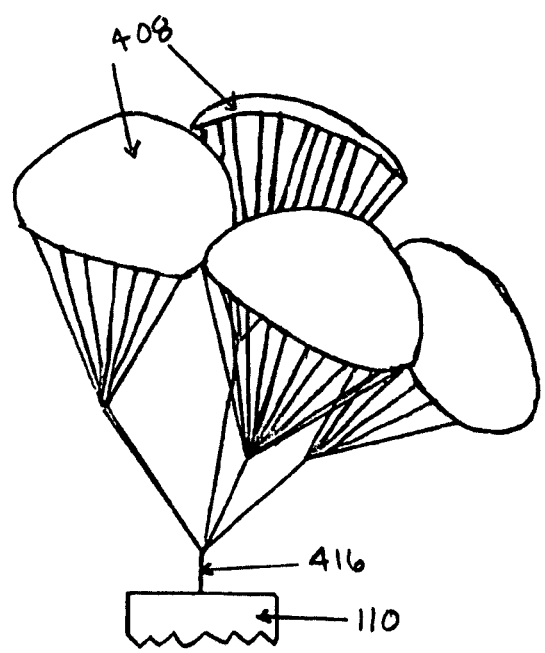
FIG. 4d depicts a view of the main parachutes deployed.

Referring to FIG. 3, the upper stage 100 utilizes a production rocket engine, capable of propelling a payload, that preferably employs cryogenic fuels for propulsion such as liquid hydrogen and liquid oxygen. A preferred second stage is the Centaur III which is powered by two rocket engines that provide 22,300 pounds of thrust each. Each of the two engines has a vacuum specific impulse of 451. In a prefened embodiment, the upper stage 100 will include a modified payload fairing 300, which is an adapter, to adjust the size of the payload compartment to carry a weight of payload mass and volume that matches the thrust and propulsion capabilities of the launch system 10. Propellants employed in the upper stage are preferably cryogenic hydrogen and oxygen.

Figure 2:
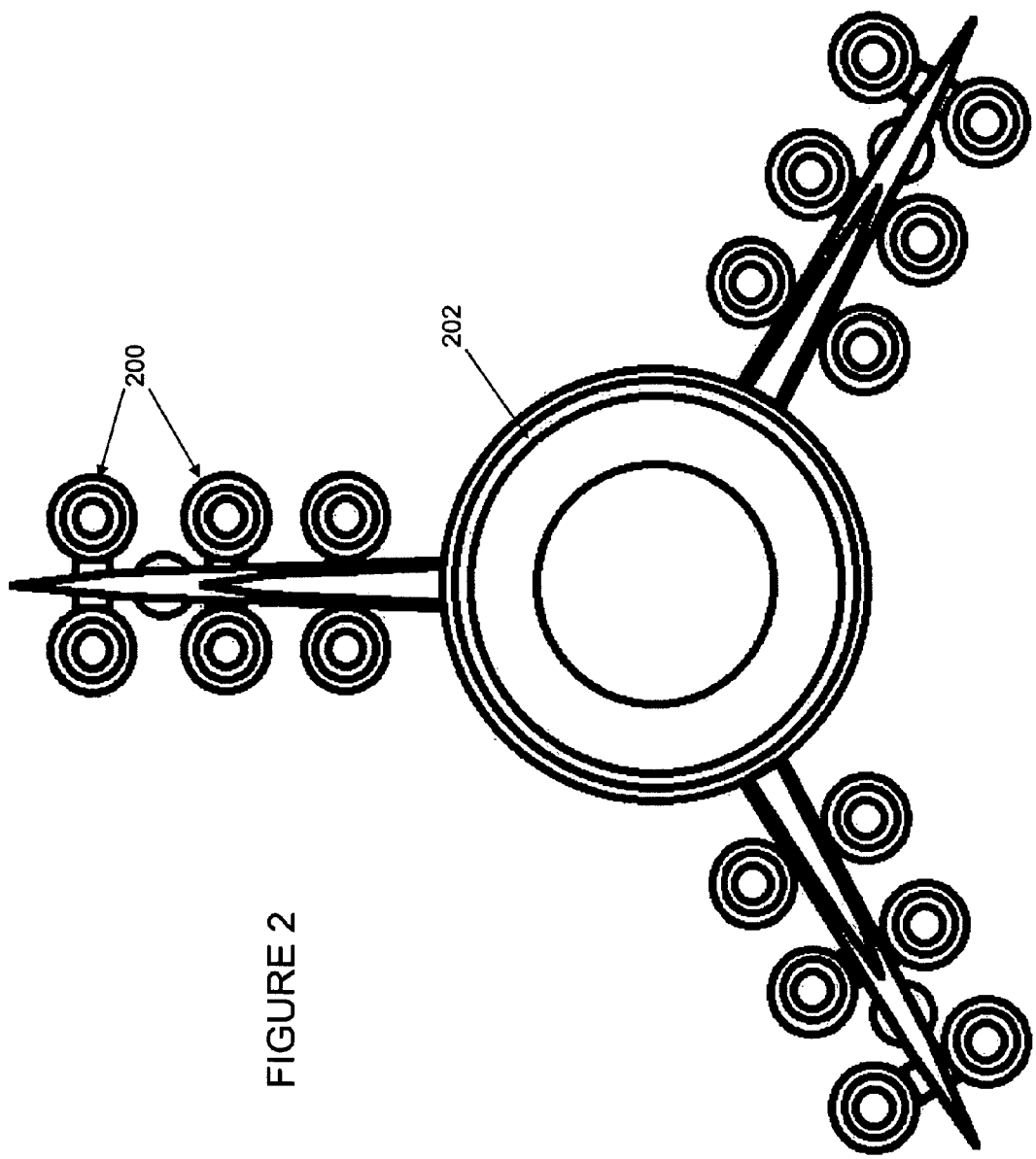
FIG. 2 depicts a top view of a cut-away of the middle and lower stage shown in FIG. 1.

Referring to FIGS. 1 and 2, in a preferred embodiment of the invention, there are three fins 112, evenly distributed around the housing 110. Preferably, each fin 112 has a moveable tip 118 that provides for aerodynamic control at higher speeds.

The plurality of air breathing engines 116 preferably comprise turbofan engines 200. In a preferred embodiment, the turbofan engines 200 are configured in a star configuration (which, for the purposes of this application, is defined as the engines are positioned along each side of the fins 112, radiating outwards from the housing 110). Preferably, there are three turbofan engines 200 positioned on each side of each fin 112, each turbofan engine 200 being parallel to the one on the opposite side of each fin 112. In this configuration, using current turbofan technology, there are preferably a total of 18 turbofan engines attached to the lower stage 106. However, in the event that turbofan technology improves, the number of turbofan engines 200 attached to the lower stage 106 may be decreased. The turbofan engines 200 normally will employ jet fuel, preferably JP-10, for operation.

The turbofan engines 200 preferably have the characteristics of the F-100-229 production engines, each with a fixed, customized inlet. Such engines have a maximum installed net thrust of 35,000 pounds in afterburner at sea level at Mach 1. In a preferred embodiment, vectored thrust vanes 120 are placed in the exhaust of the six outermost turbofan engines 200. The vectored thrust vanes 120 are used for flight control of roll, pitch, and yaw from liftoff to about Mach 2.6. The turbofan inlets should be shaped and optimized for low drag, thrust efficiency, and capability to prevent engine stall in the rotation maneuver described below, before landing. The size and performance of the turbofan engines 200 may be selected by one skilled in the art dependent upon the performance characteristics of the middle and upper stages/payload 100, 130 and the mass of the lower stage 106.

In one embodiment of the invention, the plurality of air breathing engines 116 may employ the turbofan engines 200 described above in a star shaped pattern along the fins 112 and also a plurality of ramjet engines 202 placed circumferentially along the cylinder portion of the housing 110. In this configuration, a preferred number of ramjet engines are positioned equally around the periphery of the cylinder portion of the housing 110. Preferably, the ramjet engines 202 can be a single annular engine encircling the cylinder portion of the housing 110.

In a preferred embodiment, rather than placing the ramjet engines 202 on the lower stage 106, the ramjet engines 202 will be placed on a middle stage 130. The ramjet system may be a plurality of ramjet engines positioned around the cylinder portion of the housing 132 at equal intervals or may be a single annular ramjet engine 202 placed along the cylinder of the housing 132. In this configuration, the ramjet engines 202 operate from about Mach 2 to Mach 4. The ramjet engines 202 would be operating in parallel with the turbofan engines 200 attached to the lower stage 106 from about Mach 2 to Mach 2.6. After the speed of the launch system reaches the Mach limit for the turbofan engines 116 on the lower stage 106 (assumed to be Mach 2.6), the lower stage 106 is separated from the middle stage 130 and the engines 116 are reduced to idle for descent under a parachute to a lower altitude.

The ramjet engines 202 may be designed using engine manufacturer's analytical models representing current technology and preferably have fixed geometry inlets and may have moveable inlet covers. Therefore, while these are preferably custom engines, they employ current techniques for sizing and manufacture, preferably, making use of ceramics and composite materials to reduce the weight of the ramjets 202 to about half that for similar thrust engines which may have been designed in the 1970 and 1980 time frame. Preferably, the ramjet engines 202 also burn JP-10 fuel.

Figure 5:
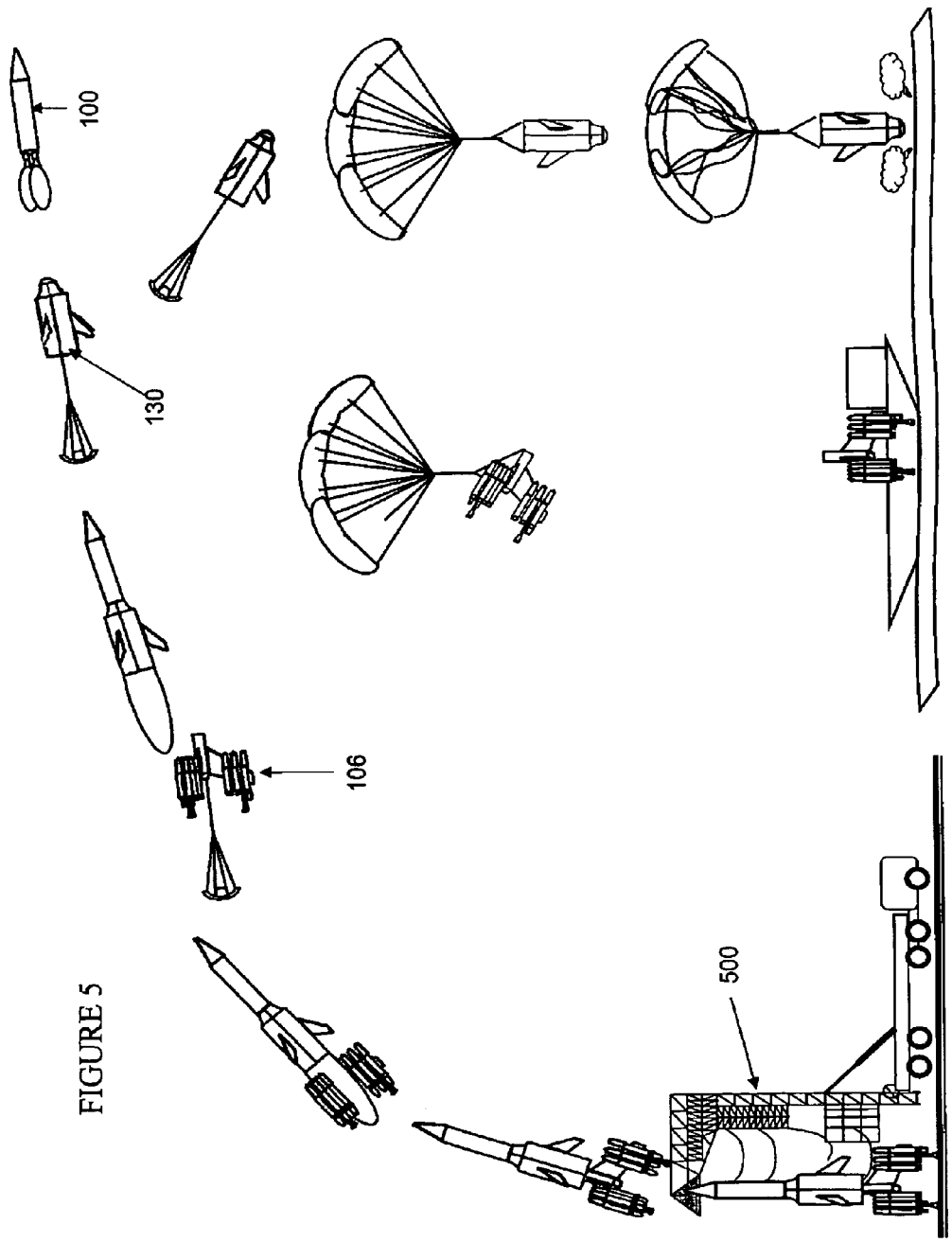
FIG. 5 depicts the launch and recovery sequence employing the system.

Referring to FIG. 5, the invention also includes a mobile launch gantry 500 that allows the system 10 to be launched in any area containing a concrete pad or similar base. Preferably the gantry 500 has tilt up capability to position the system for launch and allows fueling lines for the upper, middle, and lower stages 100, 130, 106 to run through the gantry 500 from mobile support vehicles (not depicted), including fuel trucks, that may surround the gantry 500. The gantry 500 provides ground power for fueling, systems check, and the payload until about three minutes from launch of the system 10. The gantry 500 may also include feed tanks to replenish cryogenic fuels in the upper stage 100 until right before launch of the system.

The invention also includes a method of launching and propelling a rocket bearing payload into earth orbit that is depicted in FIG. 5 and described more fully below.

In general, the method includes using the system described herein by using the turbofan engines attached to the lower stage and ramjet engines attached to the middle stage in series to launch and propel the rocket until a predetermined speed and/or altitude is reached (this speed/altitude may be selected/calculated by one skilled in the art based upon system performance and weight). First, the turbofan engines are reduced to idle after the ramjet engines have stabilized at operating thrust in the supersonic regime. The lower and middle stages are separated and after the maximum Mach Number is reached using the ramjet engines of the middle stage, the middle and upper stages are separated. The rocket propelled upper stage is then ignited and propelled into earth orbit. The lower stage is then recovered by using the drogue and main parachutes to slow its descent, releasing the main parachutes, then pitching, around and controlling the thrust of the turbofan engines to enable a vertical descent and touchdown. The middle stage is recovered after a water splashdown aided by the drogue and main parachutes to slow its descent.

More particularly, the steps of employing the system are as follows:

1. Hours before the launch, the mobile launch gantry is tilted up and the fueling lines are connected through the gantry to the system to fuel the system.

2. The bulk of Cryogenic upper stage fueling is completed about twenty minutes before launch, but top-off continues, up until the gantry is moved away from the system (launch vehicle) a few minutes prior to launch.

3. The turbofan engines are started and run at idle about ten minutes prior to launch.

4. Cryogenic propellant top-off is terminated and the gantry is moved away from the system about three minutes prior to launch.

5. The turbofan engines are fired at full afterburner thrust about ten seconds before liftoff.

6. Liftoff occurs at the programmed launch time assuming all systems are operating correctly.

7. The system reduces its pitch angle with respect to the horizon after liftoff, thereafter following the appropriate launch trajectory.

8. The ramjets are started about one minute after liftoff, after reaching minimum ignition Mach Number (estimated at Mach 2.0).

9. The turbofan engines are shut down when the turbofan engine limit Mach Number limit is reached (estimated at Mach 2.6).

10. The lower and middle stages are disconnected by means of pyrotechnic devices and the drogue parachutes are deployed from the lower stage.

11. The ramjet engines are shut down when the staging conditions (altitude and Mach Number) are reached.

12. The middle and upper stages are disconnected by means of pyrotechnic devices.

13. The upper stage engines are ignited and the stage continues to low-earth orbit.

14. Drogue parachutes are deployed from the middle stage.

15. The turbofan engines are maintained at idle.

16. The lower stage drogue parachutes are jettisoned.

17. The lower stage main parachutes are deployed at about 15,000 feet.

18. Main parachutes are released at about 7,500 feet.

19. The lower stage is rotated by thrust vector control in concert with the control surfaces on the fins until the engines are thrusting downwards.

20. The thrust of the turbofan engines is adjusted to further slow the descent of the lowert stage.

21. The turbofan engines are employed to land the lower stage (the lower stage may land on a to reasonably flat, metallic surface).

22. The middle stage drogue parachute(s) are jettisoned.

23. The middle stage main parachutes are deployed.

24. The middle stage makes a water landing.

Due to the launch trajectory of the system, recovery of the lower and middle stages normally will occur some tens of miles from the launch site. This is because of the launch trajectory of the system and due to the fact that it may require too much fuel to "fly" the lower stage back to the launch site. A barge or ship will be employed as a landing site for the lower stage. This will allow the lower stage to easily be returned to the launch site for turn-around. A ship will also be employed to recover the middle stage after its water landing.

The below charts depict a theoretical mission employing one embodiment of the present invention. Many other configurations and trajectories may be employed using the present invention.

| Event | Time | Altitude | Mach No. | Comment |
|---|---|---|---|---|
| LH2 and LOX fuelers disconnect from gantry and clear area | L − 20 min | 0 ft | 0 | Gantry retains topping capability for cryogenic fuels in small feed tanks; provides stack for H2 burn-off |
| Start fanjets, thrust at idle | L − 10 min | 0 ft | 0 | Preflight complete - warm up engines |
| Gantry disconnects and moves away | L − 3 min | 0 ft | 0 | Gantry is remotely or autonomously operated |
| Full military power | L − 10 sec | 0 ft | 0 | Throttle up for liftoff, verifying engine thrust (will not lift off on military power alone) |
| Full Afterburner power - Liftoff | L + 0 sec | 0 ft | 0 | Hold-down clamp assumed not to be required . . . requires test verification. |
| Tilt to 6.4 degrees downrange gamma angle | L + 2 sec | 100 ft | 0.06 | Begin gravity turn, begins controlling AoA using outboard engine thrust deflectors, augmented by fin surfaces as q increases |
| Ramjet start | L + 46 sec | 32,000 ft | 2.0 | Dominant control is by aerodynamic surfaces |
| Fanjets reduced to idle, stage 1 drogue is deployed, stages 1 and 2 separate | L + 53 sec | 40,000 ft | 2.6 | Precise timing of staging process not yet defined, but first stage fanjets need not be shut down; max dynamic pressure occurs here |
| Maximum Mach no. reached | L + 71 sec | 81,000 ft | 3.55 | |
| Ramjets shut down, stage 2 ballute is deployed, stage 3 separates and (Centaur) rockets ignite | L + 79 sec | 101,000 ft | 3.37 | Precise timing of staging process not defined |
| Centaur reaches max AoA of 35 degrees | L + 237 sec | 385,000 ft | 6 | Maneuver required to maintain trajectory until higher velocity attained |
| Centaur maneuvers to negative AoA of −0.2 deg | L + 407 sec | 631,000 ft | 13 | Required to reduce eccentricity and achieve orbit speed |
| Centaur rocket burnout | L + 543 sec | 751,000 ft 124 n. mi. | 27.4 (25,550 fps) | Payload separation can occur at any time after this event |
| Centaur/Payload reaches apogee | L + 3325 sec | 825,000 ft 136 n. mi. | 25,420 fps | (~55 min) |

What is described herein are specific examples of many possible variations on the same invention and are not intended in a limiting sense. The claimed invention can be practiced using other variations not specifically described above.

What is claimed is:

1. A reusable space launch system booster to help propel a payload bearing rocket propelled upper stage into orbit around the earth, comprising:
    a maximum of first and second cylindrical housings, each having a fuel tank containing fuel within the housing, the first housing releasably attached to the second housing and the second housing releasably attached to the upper stage via a mating ring;
    two descent mechanisms, one in each of the first and second housings, to slow the descent of the first housing after release from the second housing and to slow the descent of the second housing after release from the upper stage;
    a plurality of fins attached to the first and second housings;
    a plurality of air breathing engines attached to the fins of the first housing; and,
    at least an air breathing engine attached to a cylindrical surface of the second housing wherein said air breathing engines are capable of providing a minimum speed exceeding Mach 2.0 during a substantially vertical ascent.

2. The reusable space launch system booster of claim 1, wherein the at least an air breathing engine attached to the second housing comprises an annular ramjet engine around the second cylindrical housing.

3. The reusable space launch system booster of claim 2, wherein the plurality of air breathing engines attached to the first housing comprise turbofan engines.

4. The reusable space launch system booster of claim 3, wherein the plurality of turbofan engines comprises three turbofan engines attached to each side of each fin.

5. The reusable space launch system booster of claim 4, wherein the plurality of fins consists of three fins attached to each of the first and second housings.

6. The reusable space launch system booster of claim 5, wherein the descent mechanisms comprises at least one drogue parachute, stored within the housing and releasably attached to the housing and a plurality of main parachutes, stored within the housing and releasably attached to the housing.

7. The reusable space launch system booster of claim 6, further comprising landing struts attached to the fins on the first housing.

* * * * *